(12) United States Patent
Yamamoto et al.

(10) Patent No.: US 7,121,711 B2
(45) Date of Patent: Oct. 17, 2006

(54) SURFACE EMITTING DEVICE AND LIQUID CRYSTAL DISPLAY APPARATUS

(75) Inventors: Koichi Yamamoto, Fukushima-ken (JP); Hideaki Nagakubo, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 78 days.

(21) Appl. No.: 10/862,595

(22) Filed: Jun. 7, 2004

(65) Prior Publication Data

US 2004/0257795 A1 Dec. 23, 2004

(30) Foreign Application Priority Data

Jun. 17, 2003 (JP) ............... 2003-172158

(51) Int. Cl.
*F21V 7/04* (2006.01)
(52) U.S. Cl. ............... 362/633; 362/634; 362/632; 349/58; 349/63
(58) Field of Classification Search ............... 362/561, 362/603, 632–634, 606, 610, 621, 612, 31, 362/630–631; 349/58, 62–65, 60
See application file for complete search history.

(56) References Cited

U.S. PATENT DOCUMENTS

| | | | | |
|---|---|---|---|---|
| 6,390,639 B1 * | 5/2002 | Suzuki et al. | ............... | 362/631 |
| 6,629,765 B1 * | 10/2003 | Toyoda et al. | ............... | 362/612 |
| 6,825,894 B1 * | 11/2004 | Aoyagi et al. | ............... | 349/61 |
| 6,867,827 B1 * | 3/2005 | Cha et al. | ............... | 349/65 |
| 2002/0047953 A1 * | 4/2002 | Endo | ............... | 349/58 |
| 2002/0093810 A1 * | 7/2002 | Toyoda et al. | ............... | 362/31 |
| 2003/0026086 A1 * | 2/2003 | Kawashima et al. | ............... | 362/31 |
| 2003/0165054 A1 * | 9/2003 | Ohizumi et al. | ............... | 362/31 |
| 2004/0141305 A1 * | 7/2004 | Higashiyama | ............... | 362/31 |

FOREIGN PATENT DOCUMENTS

JP 2002-140913 5/2002

* cited by examiner

*Primary Examiner*—Renee Luebke
*Assistant Examiner*—Robert May
(74) *Attorney, Agent, or Firm*—Brinks Hofer Gilson & Lione (57) ABSTRACT

In a surface emitting device in which a light source is bonded to a light guide bar in contact with a light guide plate, the light source is bonded to the light guide bar using an adjusting member for adjusting the position of the light source. Examples of the adjusting member include a spacer disposed under the light source, a recessed portion provided in a molded case, a positioning guide made by extending a reflective panel, and another positioning guide formed integrally with the light guide bar.

17 Claims, 9 Drawing Sheets

SURFACE EMITTING DEVICE AND LIQUID CRYSTAL DISPLAY APPARATUS

This application claims the benefit of priority to Japanese Patent Application No. 2003-172158, herein incorporated by reference.

BACKGROUND OF THE INVENTION

1. Field of the Invention

The present invention relates to surface emitting devices and liquid crystal display (LCD) apparatuses. In particular, it relates to a bonding structure between a light source and a light guide bar in a surface emitting device for ensuring efficient use of light emerging from the light source.

2. Description of the Related Art

Some LCD apparatuses, for example, reflective LCD apparatuses, require reflection of ambient light for display. In such LCD apparatuses, those having surface emitting devices (front lights) on the front sides have been developed in order that they can be used in dark places where the ambient light is insufficient (for example, see Japanese Unexamined Patent Application Publication No. 2002-140913).

Figure 9:
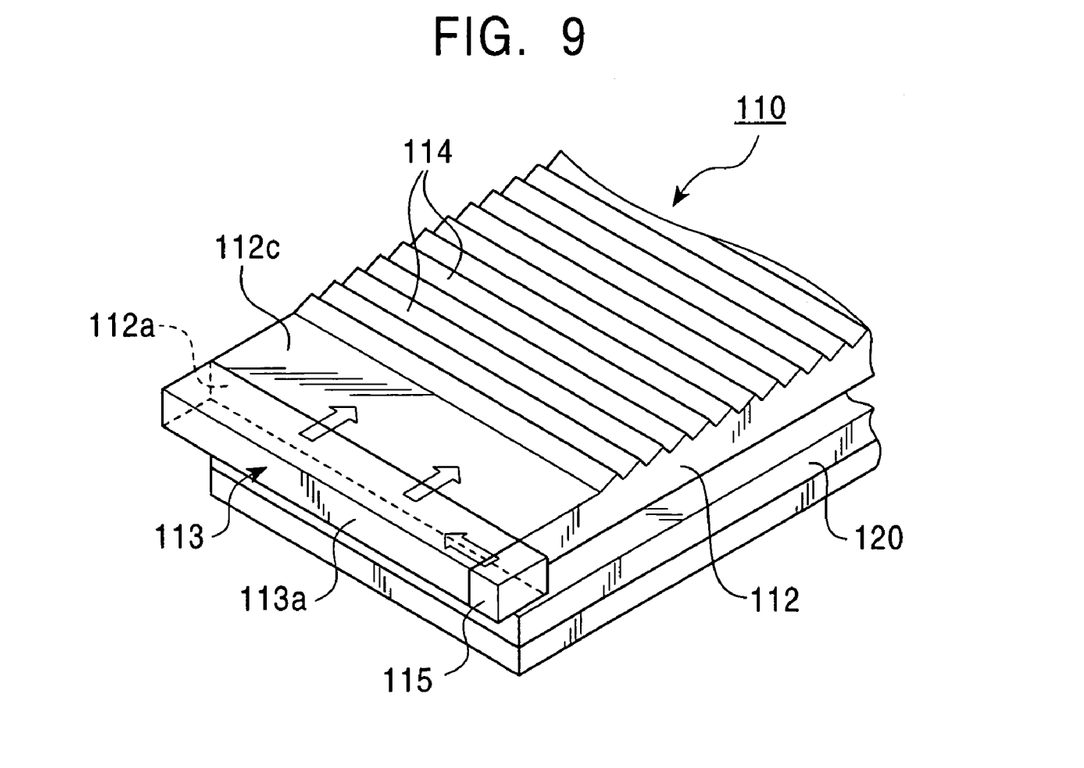
FIG. 9 is an external perspective view showing an LCD apparatus including a surface emitting device.

FIG. 9 is an external perspective view showing an LCD apparatus having a surface emitting-device. As shown in FIG. 9, a surface emitting device 110 is disposed on the front side (upper side) of a liquid crystal panel 120 such that the liquid crystal panel 120 is illuminated from the front. A light guide plate 112, a light guide bar 113, and a light source 115 constitute the main part of the surface emitting device 110.

The light source 115 is integrated with the light guide bar 113 disposed along an edge of the light guide plate 112 and serves as an extended light source that emits a wide beam of light toward a side surface of the light guide plate 112.

The light guide plate 112 is a flat plate made of, for example, transparent acrylic resin and is formed by injection molding. The light guide plate 112 is disposed parallel to a display surface of the liquid crystal panel 120. The opposing surfaces of the light guide plate 112 and the liquid crystal panel 120 have substantially the same area.

To change the direction of light traveling in the light guide plate 112, a plurality of grooves 114, which are wedge-shaped in side view, are arranged in parallel on a front surface 112c of the light guide plate 112 to form a prismatic surface.

The long light guide bar 113 is bonded to an edge of the light guide plate 112, while the light source 115 is bonded to an end of the light guide bar 113. Although only one light source 115 is disposed at one end of the light guide bar 113 in the example shown in FIG. 9, two light sources may be disposed at respective ends of the light guide bar 113. An outer surface 113a (the surface opposite to the light guide plate 112) of the light guide bar 113 is provided with prismatic grooves (not shown) such that the direction of light traveling in the light guide bar 113 is changed by reflection thereat.

The light source 115 bonded to an end of the light guide bar 113 is a point source, such as a white light emitting diode (LED) and an organic electroluminescent (EL) device, and is designed to emit light toward the end surface of the light guide bar 113.

Figure 10:
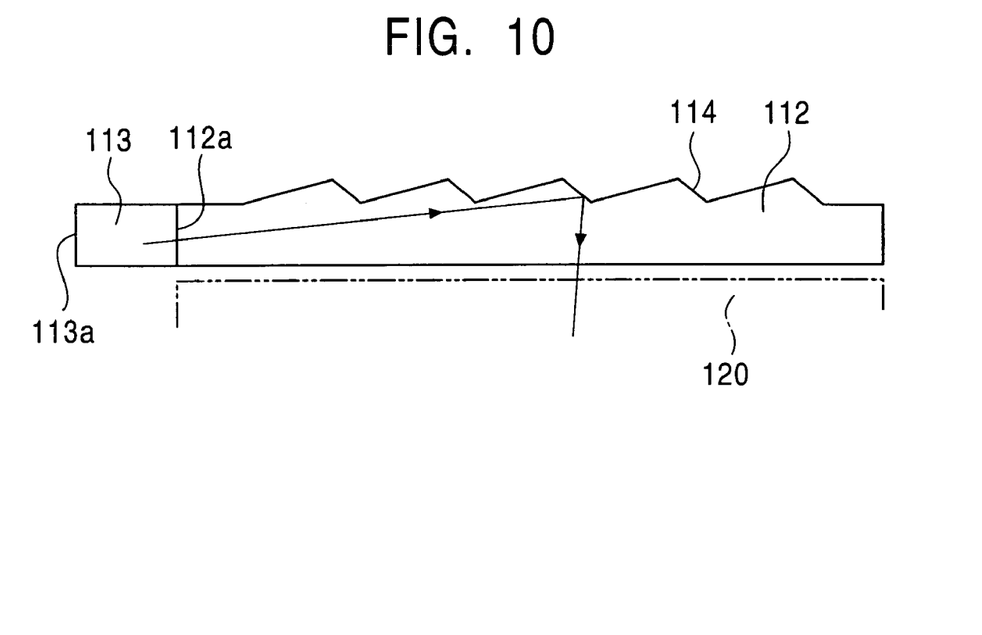
FIG. 10 shows a light path in the surface emitting device in FIG. 1.

FIGS. 9 and 10 show light paths in the surface emitting device 110. As shown in FIG. 9, the light emitted by the light source 115 enters the light guide bar 113 through the end surface thereof. The direction of the light is then changed by the prismatic surface formed on the outer surface 113a of the light guide bar 113. The light is directed toward the light guide plate 112 and travels into it through a side surface 112a thereof. Subsequently, as shown in FIG. 10, the light propagating in the light guide plate 112 is reflected off the prismatic surface of the grooves 114, changes its direction, and emerges from the emitting surface (undersurface) of the light guide plate 112 toward the liquid crystal panel 120. The light thus illuminates the liquid crystal panel 120 on the backside (underside in FIG. 10) of the surface emitting device 110.

Since the light enters the light guide plate 112 through the entire bonding surface between the light guide plate 112 and the light guide bar 113, uniformity of the light on the emitting surface of the light guide plate 112 is improved.

The surface emitting device 110 including the above-described light source 115, the liquid crystal panel 120, and other necessary attachments are mounted in a molded case to form an LCD apparatus.

Figure 11:
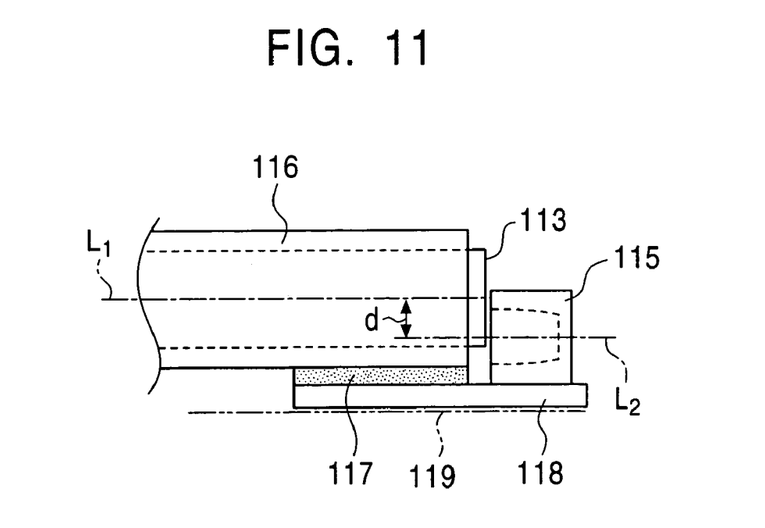
FIG. 11 shows a bonding structure between a light guide bar and a light source.

FIG. 11 shows a bonding structure between the light source 115 and the light guide bar 113. Normally, one end of a flexible printed circuit (FPC) 118 is bonded to the light source 115 for supplying power thereto, while the other end thereof is bonded with a bonding member, such as double-sided tape 117, to the light guide bar 113 or to the undersurface of a reflective panel 116 covering the light guide bar 113. Then, the surface emitting device together with the liquid crystal panel is mounted in a molded case 119. The light source 115 is thus secured to a bottom plate of the molded case 119 via the FPC 118. A displacement "d" between a centerline $L_1$ of the light guide bar 113 and a centerline $L_2$ of the light source 115 is caused by changes in thickness of the double-sided tape 117 and the FPC 118, or by the size of the LED chip constituting the light source 115. When the centerline $L_1$ and the centerline $L_2$ are not aligned, the amount of light entering the light guide from the light source is limited. This decreases the brightness, causes variations in brightness of the surface emitting device, and thus reduces the quality of a display screen of a reflective LCD apparatus.

SUMMARY OF THE INVENTION

Accordingly, embodiment of the present invention is provide a surface emitting device having an improved structure of bonding between a light source and a light guide bar, in which the optical axis of the light source is consistently aligned with a predetermined position of the light guide bar. The embodiments provide a reflective LCD apparatus with a high-quality display screen including such an improved surface emitting device.

A surface emitting device of the present invention includes a light guide plate, a light guide bar connected to the light guide plate, a light source bonded to an end of the light guide bar, and an adjusting member for adjusting the position of the light source.

For example, the adjusting member is a spacer disposed on an FPC in contact with the light source.

Another example of the adjusting member is a positioning guide formed at an end of a reflective panel.

The adjusting member may be a recessed portion provided in the bottom surface of a molded case accommodating a liquid crystal panel together with the surface emitting device.

The adjusting member may also be a recessed portion, which is formed integrally with the light guide bar, for positioning the light source.

In the surface emitting device of the present invention, the light source is easily bonded to a predetermined position on the end surface of the light guide bar. Since the centerlines of the light guide bar and the light source are aligned, all the light emitted from the light source effectively enters the light guide bar and is reflected in the light guide bar and the light guide plate to illuminate the liquid crystal panel. A brightly and uniformly illuminated liquid crystal panel can thus be provided.

Moreover, the LCD apparatus of the present invention is a reflective LCD apparatus having the surface emitting device with the above-described adjusting member for positioning of the light source. Since the LCD apparatus of the present invention has the improved surface emitting device, a reflective LCD apparatus with a bright and uniform display screen can be provided.

DESCRIPTION OF THE PREFERRED EMBODIMENTS

Figure 12:
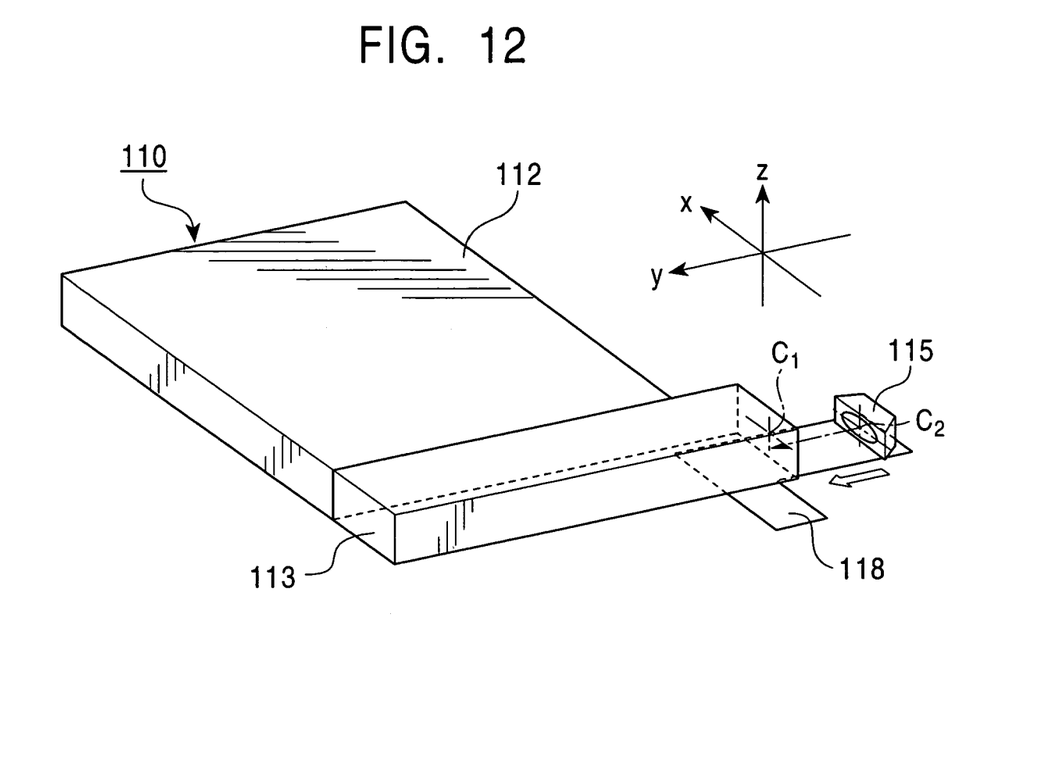
FIG. 12 shows directions of displacement between the centerline of the light guide bar and the optical axis of the light source.
Figure 13:
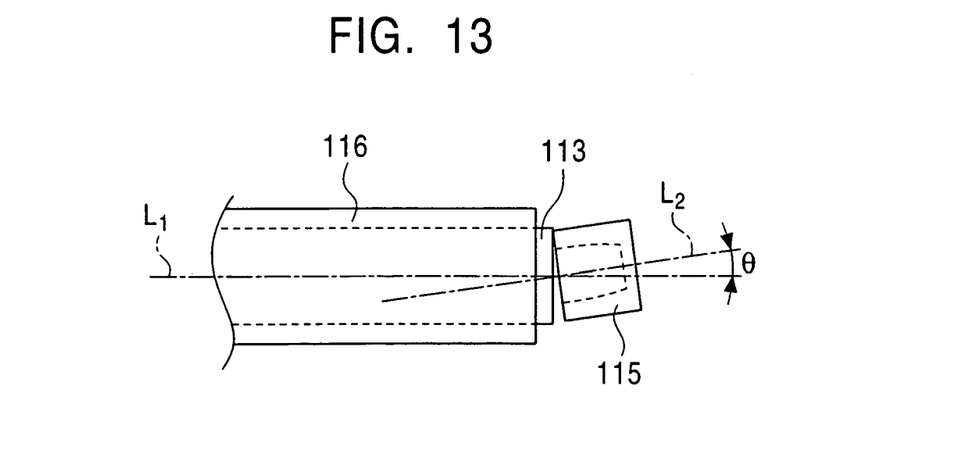
FIG. 13 shows the angle between the centerline of the light guide bar and the optical axis of the light source.

FIG. 12 shows directions of displacement between the centerline of the light guide bar and the optical axis of the light source. FIG. 13 shows the angle between the centerline of the light guide bar and the optical axis of the light source. When the light source 115 is bonded to the light guide bar 113 of the surface emitting device 110 as indicated by an arrow in FIG. 12, the centerline of the light guide bar 113 and the optical axis of the light source 115 are displaced in x, y, and z directions. Even if a center $C_1$ of the light guide bar 113 is aligned with a center $C_2$ of the light source 115, the centerline $L_1$ of the light guide bar 113 and the centerline $L_2$ of the light source 115 may not be aligned and the centerline $L_2$ is tilted at an angle θ relative to the centerline $L_1$, as shown in FIG. 13. In these cases, the light from the light source 115 cannot efficiently propagate in the light guide bar 113. This decreases the brightness, causes variations in brightness of the surface emitting device, and thus reduces the quality of a display screen of a reflective LCD apparatus.

Figure 14:
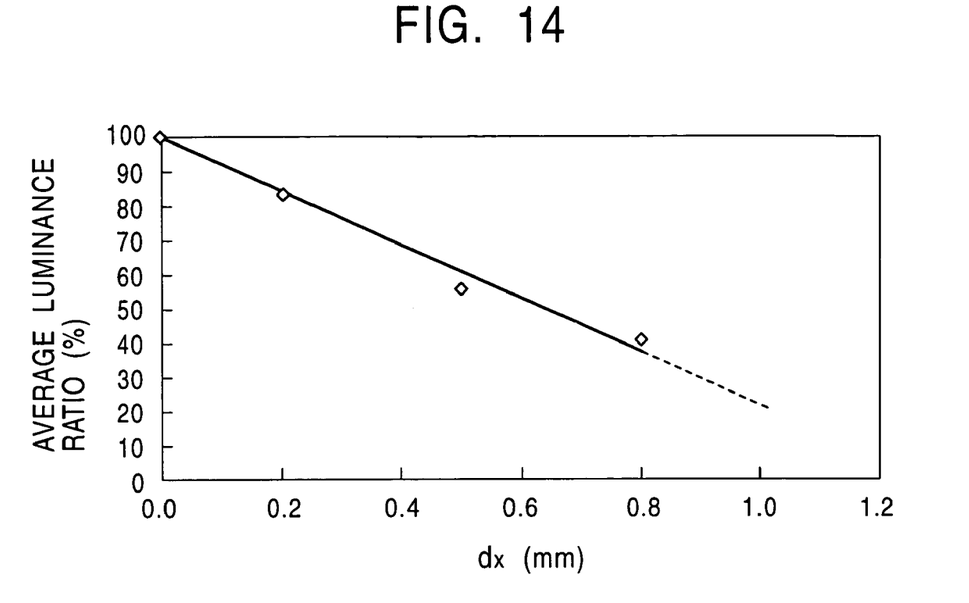
FIG. 14 shows a relationship between the average luminance ratio and the displacement in the X direction.
Figure 15:
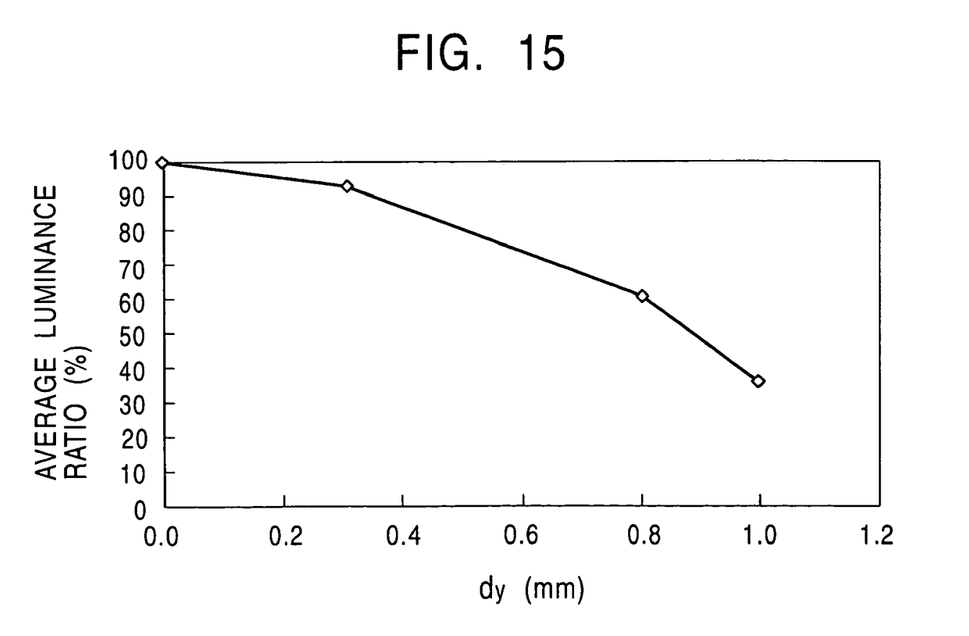
FIG. 15 shows a relationship between the average luminance ratio and the displacement in the Y direction.
Figure 16:
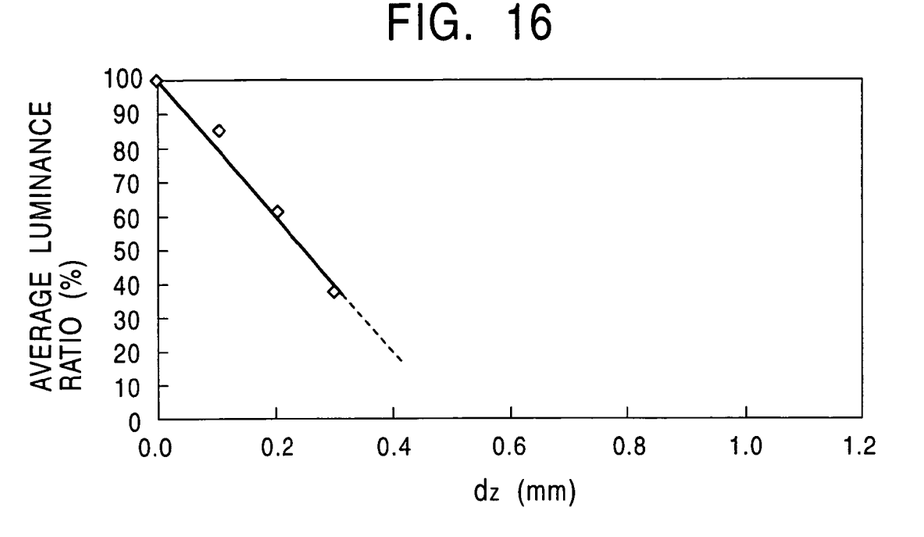
FIG. 16 shows a relationship between the average luminance ratio and the displacement in the Z direction.
Figure 17:
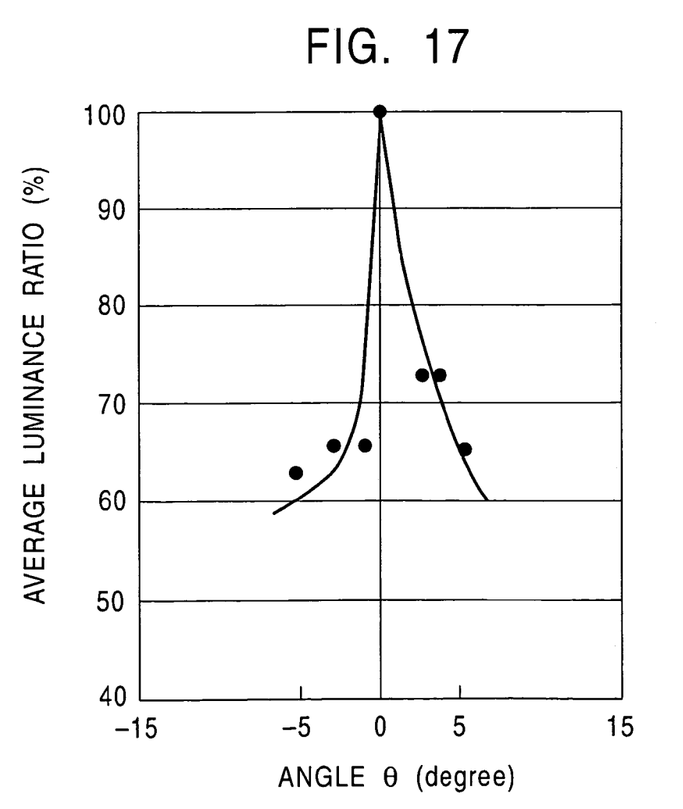
FIG. 17 shows a relationship between the angle between the optical axes and the average luminance ratio.

For example, the average luminance ratio of the surface emitting device when the center $C_1$ is aligned with the center $C_2$ and the centerline $L_1$ is aligned with the centerline $L_2$ is used as a reference. FIG. 14 shows the relationship between the average luminance ratio (%) and the amount of displacement dx (mm) when the center $C_1$ and the center $C_2$ are displaced in the x direction (along the width of the light guide bar in FIG. 12). FIG. 15 shows the relationship between the average luminance ratio (%) and the amount of space dy (mm) when the light guide bar 113 and the light source 115 are separated in the y direction (along the length of the light guide bar in FIG. 12). FIG. 16 shows the relationship between the average luminance ratio (%) and the amount of displacement dz (mm) when the center $C_1$ and the center $C_2$ are displaced in the z direction (along the height of the light guide bar in FIG. 12). Furthermore, FIG. 17 shows the relationship between the average luminance ratio (%) and the tilt angle θ when the centerline $L_2$ is tilted at an angle θ relative to the centerline $L_1$ while the center $C_1$ is aligned with the center $C_2$, as shown in FIG. 13.

In any case, the average luminance ratio significantly decreases as the amount of displacement increases.

Therefore, to provide a reflective LCD apparatus with a high-quality display screen, the light guide bar and the light source of the surface emitting device need to be bonded such that the optical axis of the light source is consistently aligned with a predetermined position of the light guide bar.

Figure 1:
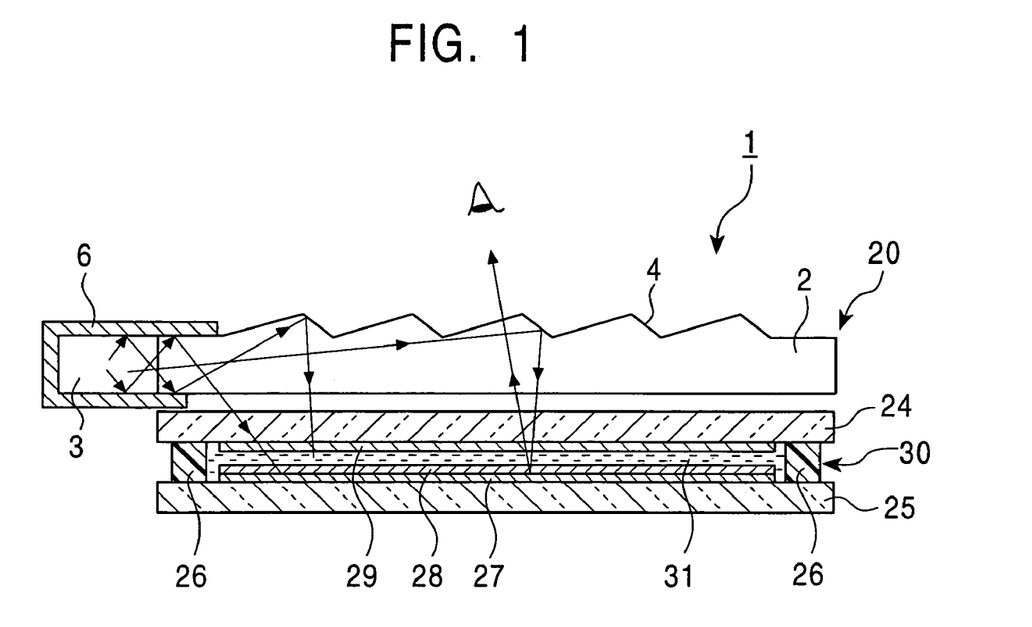
FIG. 1 is a schematic cross-sectional view of a surface emitting device according to the present invention.

FIG. 1 is a schematic cross-sectional view of an LCD apparatus according to the present invention.

A surface emitting device 20 and a liquid crystal panel 30 disposed on the backside thereof constitute the main part of an LCD apparatus 1.

While the structure of the surface emitting device 20 will not be described in detail as it is basically the same as that of the surface emitting device 110 in FIG. 9, the surface emitting device 20 is different in that the exterior of a light guide bar 3 is covered with a reflective panel 6. The reflective panel 6 is a pressed metal plate of high reflectivity, such as a stainless steel plate with a mirror-finished surface, and is fitted, together with the light guide bar 3, into the edge of a light guide plate 2. While securing the light guide bar 3 to the light guide plate 2, the reflective panel 6 reflects the light traveling in the light guide bar 3 toward the light guide plate 2.

The liquid crystal panel 30 is disposed under the light guide plate 2. In the liquid crystal panel 30, a liquid crystal layer 31 is interposed between a first substrate 24 and a second substrate 25 that are bonded with a sealing member 26. The first substrate 24 is provided with a display circuit 29 on the surface adjacent to the liquid crystal layer 31. The display circuit 29 includes an electrode layer and an alignment layer and controls the liquid crystal layer 31. The second substrate 25 is provided with a reflective film 27 and a display circuit 28 stacked in this order on the surface adjacent to the liquid crystal layer 31. The reflective film 27 reflects the light incident on the liquid crystal panel 30, while the display circuit 28 includes an electrode layer and an alignment layer and controls the liquid crystal layer 31. The reflective film 27 may have some surface roughness for diffusing the reflected light.

While not illustrated in FIG. 1, a light source is bonded to the end face of the light guide bar 3 (as if placed on the surface of the drawing).

In the LCD apparatus described above, the light from the light source is reflected off the reflective panel 6 on the surface of the light guide bar 3, changes its direction, and enters the light guide plate 2 from its side surface opposing the emitting surface of the light guide bar 3. The light traveling in the light guide plate 2 is reflected at grooves 4 on the prismatic surface of the light guide plate 2, changes its direction, and emerges from the emitting surface of the light guide plate 2 to illuminate the liquid crystal panel 30.

The light incident on the liquid crystal panel 30 passes through the first substrate 24, the display circuit 29, the liquid crystal layer 31, and the display circuit 28 to reach the reflective film 27. The light is then reflected off the reflective film 27, returned to the liquid crystal layer 31, and emitted from the upper surface of the liquid crystal panel 30 to reach the light guide plate 2, and further, to reach the user's eyes. Thus, through the use of the surface emitting device 20 as a light source for the reflective liquid crystal panel 30, the LCD apparatus of the present invention can provide a display that is highly visible even in dark places where the ambient light is insufficient. Moreover, the use of the surface emitting device of the present invention enables the LCD apparatus to achieve uniform luminance and brightness over the entire display area, and thus, a considerable improvement in image quality, compared to that of known LCD apparatuses.

In the present invention, as described below, the light source is bonded to the light guide bar using adjusting members for positioning of the light source.

[First Embodiment]

Figure 2:
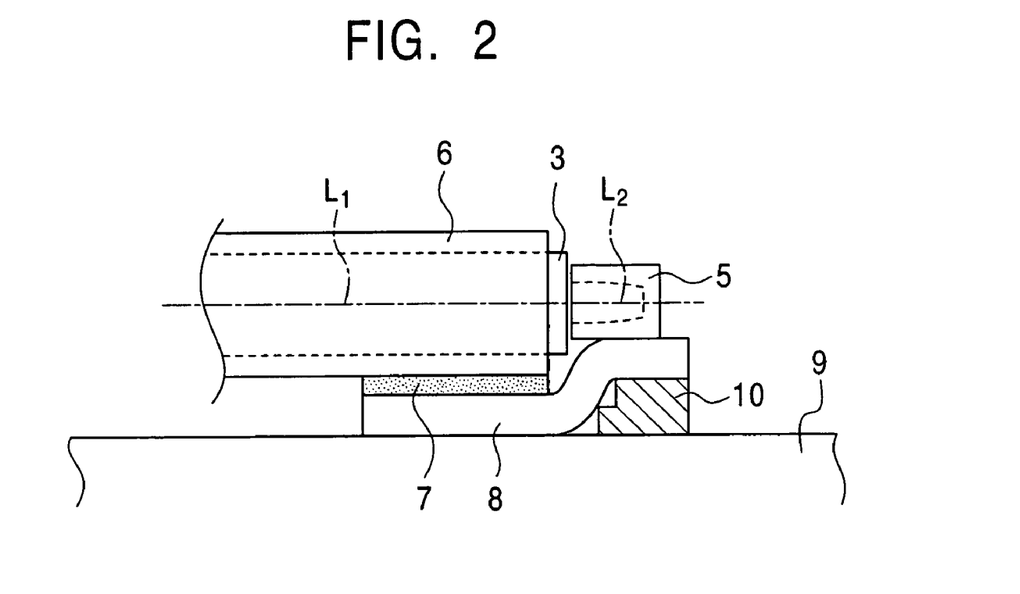
FIG. 2 is a cross-sectional view showing a bonding structure between a light guide bar and a light source according to a first embodiment of the present invention.

FIG. 2 is a cross-sectional view showing a bonding structure between the light guide bar and the light source of the surface emitting device according to a first embodiment of the present invention.

In the present embodiment, a spacer 10 is placed under the light source 5 with an end of an FPC 8 being disposed therebetween. The FPC 8 extends under the reflective panel 6 of the surface emitting device 20 and is bonded to the undersurface of the reflective panel 6 with a bonding member 7, such as double-sided tape. After bonding the light source 5 to an end surface of the light guide bar 3, the entire LCD apparatus including the surface emitting device is mounted in a molded case 9. The height of the spacer 10 is adjusted such that the centerline $L_2$ of the light source 5 and the centerline $L_1$ of the light guide bar 3 come into alignment when the entire LCD apparatus is placed on the bottom plate of the molded case 9. As shown in FIG. 2, the undersurfaces of the spacer 10 and the FPC 8 are aligned parallel to the bottom surface of the molded case 9. Since the spacer 10 thus adjusts the height of the light source 5, displacement in the z direction shown in FIG. 12 can be prevented.

[Second Embodiment]

Figure 3:
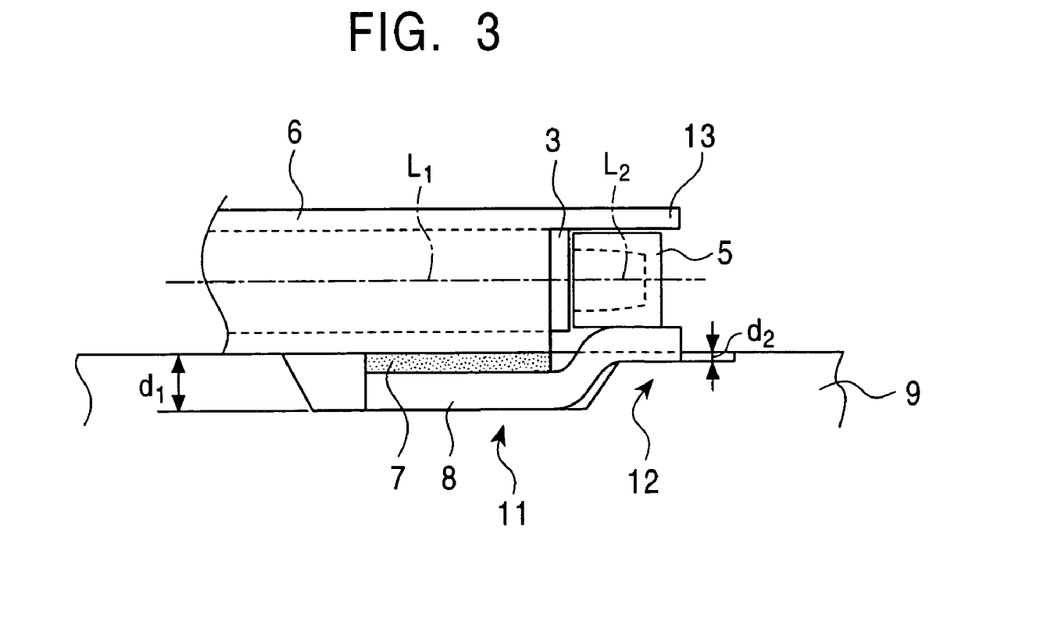
FIG. 3 is a cross-sectional view showing a bonding structure between a light guide bar and a light source according to a second embodiment of the present invention.

FIG. 3 is a cross-sectional view showing a bonding structure between the light guide bar and the light source of a surface emitting device according to a second embodiment of the present invention. In the present embodiment, the bottom plate of the molded case 9 for holding the entire LCD apparatus is provided with recessed portions 11 and 12 for accommodating the FPC 8 that is in contact with the light source 5. The depths of the recessed portions 11 and 12 are adjusted such that the centerline $L_2$ of the light source 5 and the centerline $L_1$ of the light guide bar 3 come into alignment when the LCD apparatus comes assembled. A depth $d_1$ of the recessed portion 11 is adjusted, for example, to the total thickness of the bonding member 7 and the FPC 8 when the FPC 8 is bonded to the undersurface of the reflective panel 6 with the bonding member 7. A depth $d_2$ of the recessed portion 12 is adjusted, depending on the size of the light source 5, such that the centerline $L_2$ of the light source 5 in contact with the FPC 8 and the centerline $L_1$ of the light guide bar 3 come into alignment when the light source 5 is bonded to the end surface of the light guide bar 3. The recessed portion 12 may be eliminated or it may even be a protruding surface, depending on the thicknesses of the light source 5 and the FPC 8.

In FIG. 3, moreover, the upper portion of the reflective panel 6 extends to the light source 5 to define the position of the upper surface thereof. Since the upper and lower positions of the light source 5 are thus adjusted, displacement in the z direction shown in FIG. 12 can be reliably prevented.

[Third Embodiment]

Figure 4:
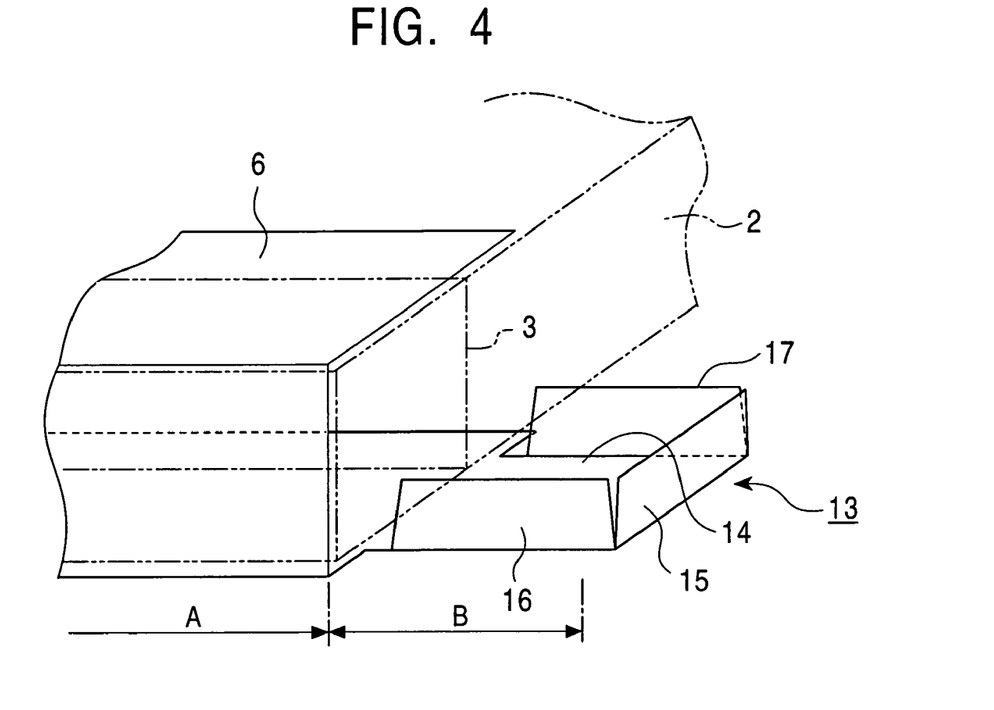
FIG. 4 is an external perspective view of a positioning guide used for bonding between a light guide bar and a light source according to a third embodiment of the present invention.

FIG. 4 is an external perspective view of a positioning guide used for bonding between the light guide bar and the light source according to a third embodiment of the present invention.

In the present embodiment, the reflective panel 6 extends to the light source (not shown in FIG. 4) and is bent at the end thereof to form side walls 15, 16, and 17. The space surrounded by these side walls 15, 16, and 17 serves as a positioning guide 13 for accommodating and positioning the light source. The lower position of the light source is defined by a bottom plate 14 of the positioning guide 13. The dimensions of the positioning guide 13 need to be determined such that the centerline $L_2$ of the light source 5 and the centerline $L_1$ of the light guide bar 3 are aligned. The positioning guide 13 of the present embodiment is, for example, a bent stainless plate with a mirror-finished surface, in which a reflective-panel section A and a positioning-guide section B are formed in one piece.

Figure 5:
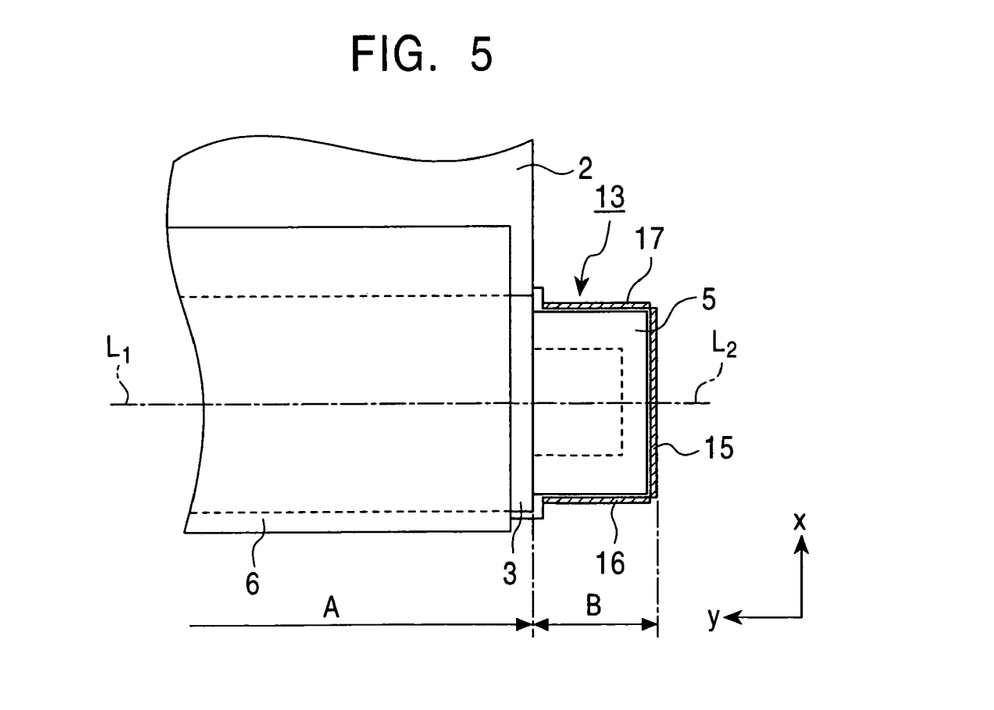
FIG. 5 is a plan view showing a bonding structure between the light guide bar and the light source according to the third embodiment of the present invention.

FIG. 5 is a plan view showing a bonding structure between the light guide bar and the light source according to the third embodiment of the present invention.

When the above-described positioning guide 13 is used for bonding between the light guide bar 3 and the light source 5, the light source 5 is surrounded by the side walls 15, 16, and 17 and secured. Thus, displacement in the x and y directions shown in FIG. 5 can be prevented, and the centerline $L_2$ of the light source 5 and the centerline $L_1$ of the light guide bar 3 are perfectly aligned.

Figure 6:
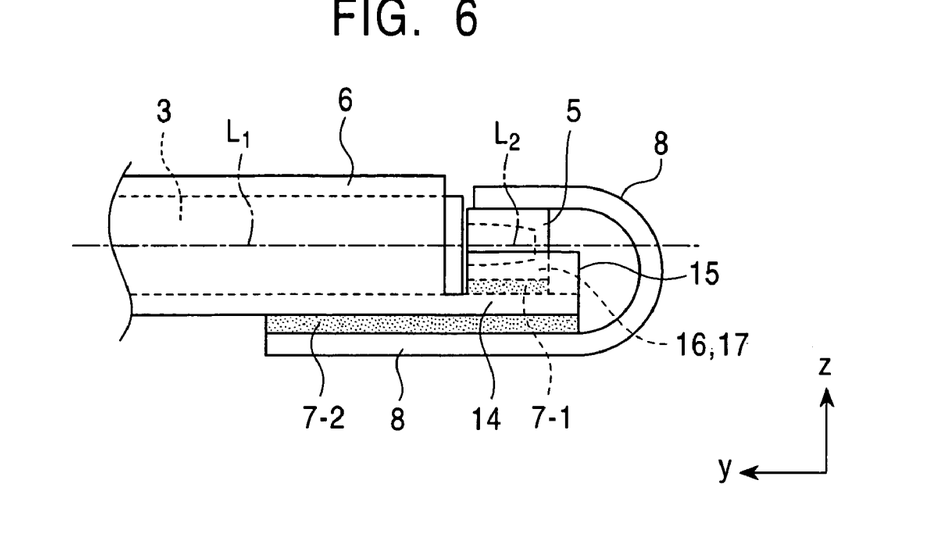
FIG. 6 is a cross-sectional view showing a bonding structure between the light guide bar and the light source according to the third embodiment of the present invention.

FIG. 6 is a cross-sectional view showing a bonding structure between the light guide bar and the light source according to the third embodiment of the present invention. Here, the light source 5 is bonded with a bonding member 7-1 to the bottom plate 14 of the positioning guide 13, surrounded by the side walls 15, 16, and 17 and secured.

Moreover, the upper surface of the light source 5 is in contact with the FPC 8, which is bonded to the undersurface of the reflective panel 6 with a bonding member 7-2. Thus, displacement in the z direction shown in FIG. 6 can be prevented, and the centerline $L_2$ of the light source 5 and the centerline $L_1$ of the light guide bar 3 are perfectly aligned. Alternatively, the upper plate of the reflective panel 6 may extend toward the light source 5 to sandwich it for vertical positioning thereof.

[Fourth Embodiment]

Figure 7:
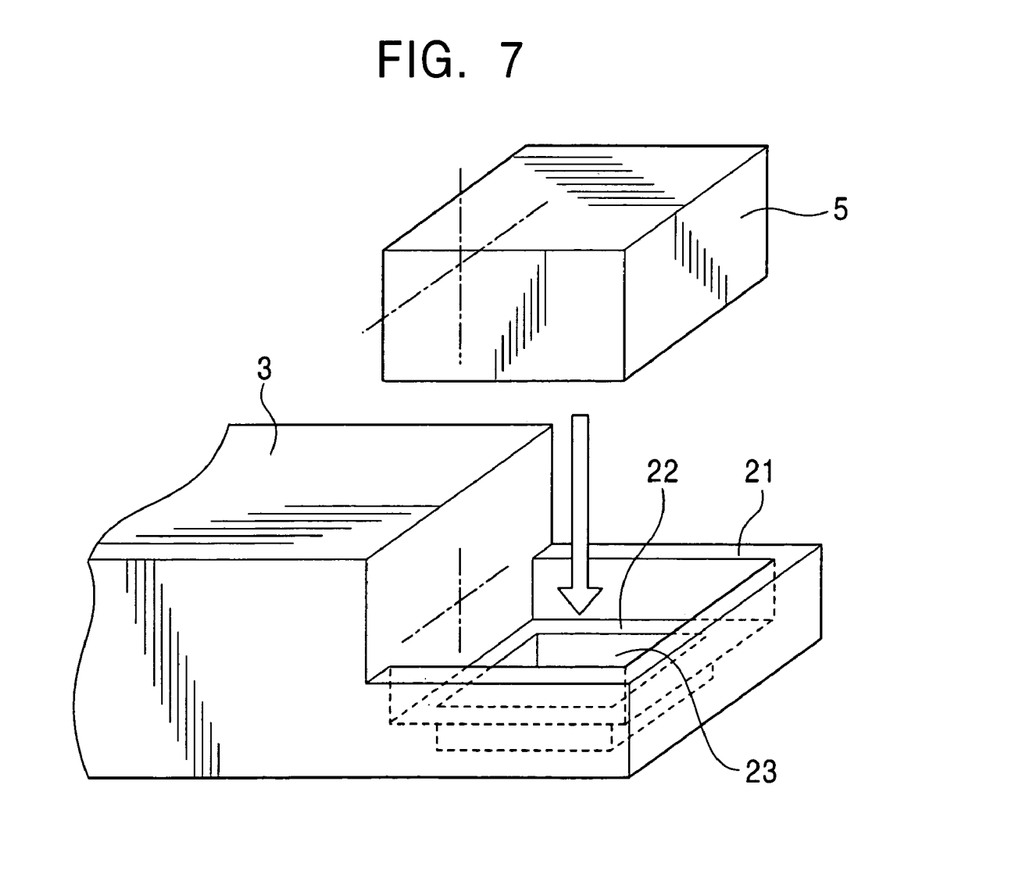
FIG. 7 is an external perspective view of a positioning guide used for bonding between a light guide bar and a light source according to a fourth embodiment of the present invention.

FIG. 7 is an external perspective view of a positioning guide used for bonding between the light guide bar and the light source according to a fourth embodiment of the present invention.

In the present embodiment, the light guide bar 3 extends toward the light source 5 to form a positioning guide 21 at the end thereof. The positioning guide 21 has a shelf 22 for placing the light source 5, as well as three side walls surrounding the light source 5 similarly to the third embodiment. The positioning guide 21 accommodates the light source 5 for positioning thereof. The dimensions of the positioning guide 21 are defined such that the centerline $L_2$ of the light source 5 and the centerline $L_1$ of the light guide bar 3 are aligned. The light guide bar 3, which extends to form the positioning guide 21 in one piece, is made of, for example, acrylic resin, polycarbonate resin, and epoxy resin that have high transparency and tend not to produce birefringence.

Figure 8:
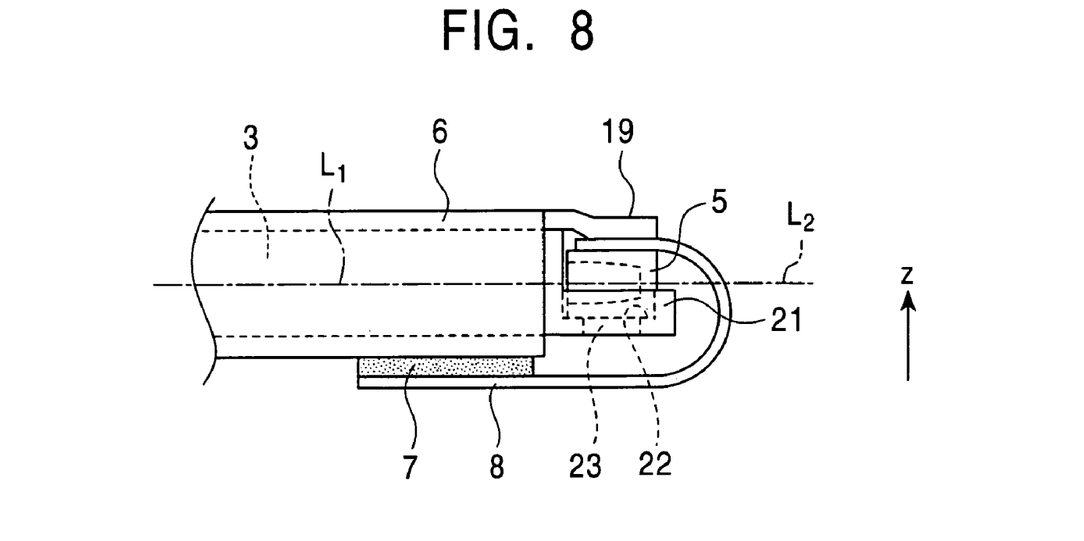
FIG. 8 is a cross-sectional view showing a bonding structure between the light guide bar and the light source according to the fourth embodiment of the present invention.

FIG. 8 is a cross-sectional view showing a bonding structure between the light guide bar and the light source according to the fourth embodiment of the present invention.

Here, the light guide bar 3 and the positioning guide 21 are formed in one piece, and the light source 5 is fitted in the positioning guide 21. Moreover, the reflective panel 6 extends toward the light source 5 to form a retaining plate 19 over the FPC 8. The retaining plate 19 holds down the light source 5 disposed under the FPC 8. Together with the shelf 22 in the positioning guide 21, the retaining plate 19 prevents displacement of the light source 5 in the z direction shown in FIG. 8. Moreover, the FPC 8 is bonded to the undersurface of the reflective panel 6 with the bonding member 7 and secured.

Thus, the centerline $L_2$ of the light source 5 and the centerline $L_1$ of the light guide bar 3 are perfectly aligned.

Additionally, the shelf 22 may be provided with a cooling hole 23 for cooling the light source 5.

What is claimed is:

1. A liquid crystal display device apparatus comprising:
a liquid crystal panel;
a surface emitting device; and
a molded case covering the liquid crystal panel and the surface emitting device,
wherein the surface emitting device comprises:
a light guide plate;
a light guide bar connected to the light guide plate;
a light source bonded to an end of the light guide bar;
a flexible printed circuit on which the light source is disposed; and
an adjusting member for adjusting a position of the light source, the adjusting member containing at least one recessed portion provided in a bottom surface of the molded case, and
wherein the light guide bar is mounted in the molded case such that the flexible printed circuit is disposed in the at least one recessed portion between a bottom of the at least one recessed portion and a bottom of the light guide bar.

2. The liquid crystal display device apparatus according to claim 1, wherein the surface emitting device is disposed in front of the liquid crystal panel.

3. The liquid crystal display device apparatus according to claim 1, wherein the at least one recessed portion comprises a plurality of recessed portions of different depths in which the flexible printed circuit is disposed, a depth of a recessed portion in which a part of the flexible printed circuit to which the light source is bonded is set such that a centerline of the light source and a centerline of the light guide bar are coincident.

4. The liquid crystal display device apparatus according to claim 1, wherein the light guide bar is covered with a reflective panel, and a part of the reflective panel disposed at the end of the light guide bar extends to the light source to define the position of the light source.

5. The liquid crystal display device apparatus according to claim 4, wherein the flexible printed circuit is bonded to an undersurface of the reflective panel via a bonding member.

6. The liquid crystal display device apparatus according to claim 5, wherein the at least one recessed portion comprises a first recessed portion in which the flexible printed circuit and the bonding member are disposed and a second recessed portion in which, of the flexible printed circuit and the bonding member, only the flexible printed circuit is disposed.

7. The liquid crystal display device apparatus according to claim 6, wherein a depth of the second recessed portion is set such that a centerline of the light source and a centerline of the light guide bar are coincident.

8. A surface emitting device comprising:
a light guide plate;
a light guide bar connected to the light guide plate;
a light source bonded to an end of the light guide bar;
a flexible printed circuit on which the light source is disposed; and
a molded case containing at least one recessed portion provided in a bottom surface thereof,
wherein the flexible printed circuit is disposed in the at least one recessed portion between a bottom of the at least one recessed portion and a bottom of the light guide bar.

9. The surface emitting device according to claim 8, wherein the at least one recessed portion comprises a plurality of recessed portions of different depths in which the flexible printed circuit is disposed, a depth of a recessed portion in which a part of the flexible printed circuit to which the light source is bonded is set such that a centerline of the light source and a centerline of the light guide bar are coincident.

10. The surface emitting device according to claim 8, wherein the light guide bar is covered with a reflective panel, and a part of the reflective panel disposed at the end of the light guide bar extends to the light source to define the position of the light source.

11. The surface emitting device according to claim 10, wherein the flexible printed circuit is bonded to an undersurface of the reflective panel via a bonding member.

12. The surface emitting device according to claim 11, wherein the at least one recessed portion comprises a first recessed portion in which the flexible printed circuit and the bonding member are disposed and a second recessed portion in which, of the flexible printed circuit and the bonding member, only the flexible printed circuit is disposed.

13. The surface emitting device according to claim 12, wherein a depth of the second recessed portion is set such that a centerline of the light source and a centerline of the light guide bar are coincident.

14. A surface emitting device comprising:
- a lightguide plate;
- a light guide bar connected to the light guide plate;
- a light source bonded to an end of the light guide bar;
- a flexible printed circuit on which the light source is disposed; and
- a molded case containing at least one recessed portion provided in a bottom surface thereof,
- wherein the flexible printed circuit is disposed in the at least one recessed portion between a bottom of the at least one recessed portion and a bottom of the light source,
- wherein the light guide bar is covered with a reflective panel, and a part of the reflective panel disposed at the end of the light guide bar extends to the light source to define the position of the light source, and
- wherein the flexible printed circuit is bonded to an undersurface of the reflective panel via a bonding member.

15. The surface emitting device according to claim 14, wherein the at least one recessed portion comprises a plurality of recessed portions of different depths in which the flexible printed circuit is disposed, a depth of a recessed portion in which a part of the flexible printed circuit to which the light source is bonded is set such that a centerline of the light source and a centerline of the light guide bar are coincident.

16. The surface emitting device according to claim 14, wherein the at least one recessed portion comprises a first recessed portion in which the flexible printed circuit and the bonding member are disposed and a second recessed portion in which, of the flexible printed circuit and the bonding member, only the flexible printed circuit is disposed.

17. The surface emitting device according to claim 16, wherein a depth of the second recessed portion is set such that a centerline of the light source and a centerline of the light guide bar are coincident.

* * * * *